US007638233B2

(12) United States Patent
Vettoretti et al.

(10) Patent No.: US 7,638,233 B2

(45) Date of Patent: Dec. 29, 2009

(54) ELECTRIC HAND TOOL

(75) Inventors: Alain Vettoretti, Bourg les Valence (FR); Jean-Luc Simonin, Barcelonne (FR)

(73) Assignee: Societe de Prospection et d'Inventions Techniques SPIT, Bourg-les-valence (FR)

( * ) Notice: Subject to any disclaimer, the term of this patent is extended or adjusted under 35 U.S.C. 154(b) by 1017 days.

(21) Appl. No.: 10/803,159

(22) Filed: Mar. 18, 2004

(65) Prior Publication Data

US 2004/0258983 A1 Dec. 23, 2004

(30) Foreign Application Priority Data

Mar. 19, 2003 (FR) .................................. 03 03371

(51) Int. Cl.
*H01M 2/10* (2006.01)

(52) U.S. Cl. ..................................................... 429/100

(58) Field of Classification Search ................. 173/217; 277/8; 227/130; 310/50; 429/97, 100, 151, 429/163, 96

See application file for complete search history.

(56) References Cited

U.S. PATENT DOCUMENTS

| | | | | |
|---|---|---|---|---|
| 5,881,823 | A | 3/1999 | Kabatnik et al. | |
| 6,357,534 | B1 * | 3/2002 | Buetow et al. | 173/217 |
| 6,376,942 | B1 | 4/2002 | Burger et al. | |
| 2004/0033415 | A1 * | 2/2004 | Chen et al. | 429/99 |

FOREIGN PATENT DOCUMENTS

| | | |
|---|---|---|
| EP | 1205282 | 5/2002 |

* cited by examiner

*Primary Examiner*—Patrick Ryan
*Assistant Examiner*—Monique Wills
(74) *Attorney, Agent, or Firm*—Lowe Hauptman Ham & Berner, LLP

(57) ABSTRACT

The tool has, in a casing (2), electrically operated components and a housing (4) to accommodate a battery (3) that powers the components, with detachable elements (10, 24) of securing the battery in its housing in a position of mechanical locking and electrical connection to the components and in a position in which it is mechanically retained in its housing but electrically disconnected. The securing element (24) is designed to retrain the battery (3) in the electrically disconnected position only by friction (24, 31), thus avoiding any wrong move.

14 Claims, 1 Drawing Sheet

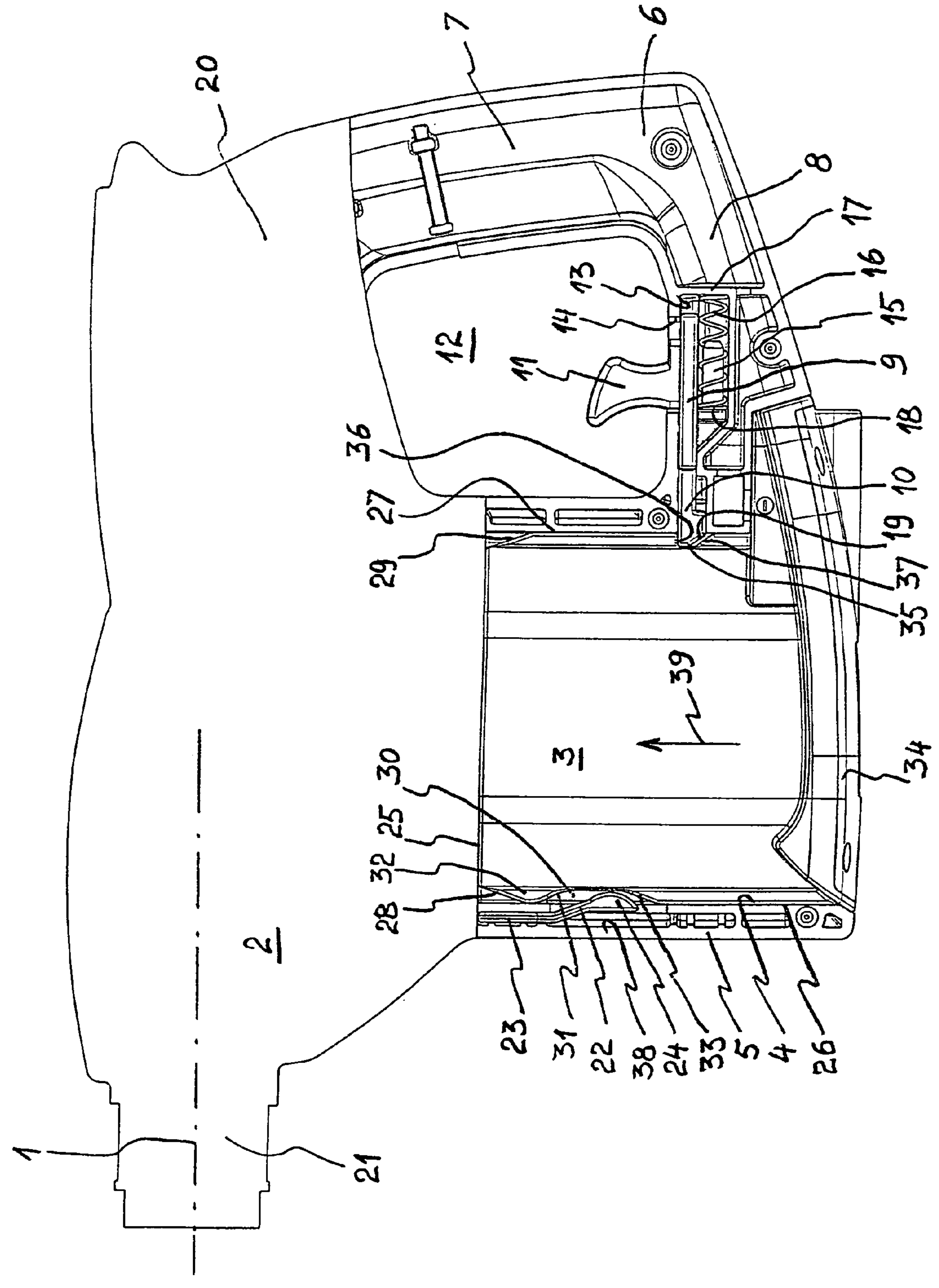
1
2
3
4
5
6
7
8
9
10
11
12
13
14
15
16
17
18
19
20
21
22
23
24
25
26
27
28
29
30
31
32
33
34
35
36
37
38
39

ELECTRIC HAND TOOL

FIELD OF THE INVENTION

The invention relates to a manually operated apparatus or tool such as, for example, a drilling or holing apparatus, of the power hammer type, or a fastening apparatus of the sealing apparatus type having a piston propelled by gas.

BACKGROUND OF THE INVENTION

Such apparatuses may have operating and control electronics, an igniter plug, a fan, an electric motor or other components requiring an electrical power supply. Being manually operated and self-contained, they also comprise a power supply battery.

Once the battery has been mounted on the outside of the collection of the other elements of the apparatus, with the disadvantage, in particular, of exposing them to knocks which may damage them, a proposal was made to arrange them in an accommodating housing inside the apparatus, formed, for example, in a leg connected to the central body of the apparatus and running parallel to its operating handle.

As a safety measure, it was then proposed for the battery to be fixed in the apparatus by means of a double-action locking device, it being possible first of all for the battery to be locked mechanically and electrically and then disconnected electrically from the remainder of the apparatus while remaining mechanically connected thereto so as to prevent the operator from letting it fall out through not paying sufficient attention. Document EP 1 205 282 teaches such a device comprising, on the apparatus, a double trigger for actuating two retaining fingers designed to collaborate in succession with a single retaining catch formed on the battery. However, such an arrangement does not set aside the risk of the operator inadvertently actuating the double trigger twice and thus completely releasing the battery from the apparatus.

SUMMARY OF THE INVENTION

The present invention is aimed at reducing such a risk.

To this end, the invention relates first of all to an electric hand tool comprising, in a casing, electrically operated components and a housing to accommodate a battery that powers the said components, with detachable means of securing the battery in its housing in a position of mechanical locking and electrical connection to the said components and in a position in which it is mechanically retained in its housing but electrically disconnected, characterized in that the securing means are designed to retain the battery in the electrically disconnected position only by friction.

By virtue of the invention, in order to completely release the battery from the tool, an operator is obliged to take it in his hand and remove it from its housing, overcoming the friction forces which retain it, thus avoiding any risk of an unintentional wrong move.

In the preferred embodiment of the tool of the invention, the battery-accommodating housing is designed to accommodate therein a battery by sliding, and the battery securing means comprise an electrical locking finger and a mechanical retaining finger both mounted so that they can move, in a direction roughly orthogonal to the direction in which the battery slides, between a lock and a retaining position, respectively, and a retracted position.

As a preference, the locking and retaining fingers are mounted so that they can be moved into the retracted position against the action of elastic return means.

Advantageously, the locking finger is secured to a rod mounted to slide into the retracted position against the action of a return spring under the action of an actuating trigger and the retaining finger is secured to a pivoting elastic leaf.

Advantageously too, the locking finger and the retaining finger are mounted to be moved into the retracted position, one in each of two opposite directions.

The invention also relates to a battery for powering electrically operated components for the electric hand tool of the invention, characterized in that it comprises a mechanical and electrical locking catch and mechanical retaining ramp means.

In the preferred embodiment of the battery, the locking catch is formed by an undercut internal shoulder and the ramp means comprise a retaining boss with an entry ramp and an opposite retaining ramp advantageously formed near the entry end of the battery, via which end it is introduced into its accommodating housing in the tool, the locking catch and the retaining boss being formed respectively on two opposite sides of the battery.

BRIEF DESCRIPTION OF THE DRAWING

The invention will be better understood with the aid of the following description of the preferred embodiments of the tool and of the battery of the invention, with reference to the attached FIGURE depicting them in section, but, for clarity, with no hatching.

DETAILED DESCRIPTION OF THE INVENTION

The tool depicted in the FIGURE in this instance is a hammer drill intended to strike a drill bit, also driven in terms of rotation in support material, via a piston propelled in a cylinder, along an axis 1, under the action of an electric motor powered by a battery 3 arranged in an accommodating housing 4 formed in a leg 5, running roughly orthogonal to the axis 1 and connected to the casing 2.

Also connected to the casing is an elbowed operating handle 6, with a leg portion 7 roughly parallel to the leg housing the battery 5 and a portion 8, for connection to the accommodating leg 5, running roughly parallel to the axis 1.

Housed in a housing 13 in the connecting portion of the handle 8 is a mechanical and electrical locking rod 9 running roughly parallel to the axis 1. In its continuation, on the side facing towards the battery housing 4, the rod 9 bears a locking finger 10.

The locking rod 9 also bears, laterally, an actuating trigger 11 projecting from the handle 6 through an aperture 14, on the inside 12, between the two portions 7, 8 and a return finger 15, running parallel to the rod 9, onto which there is slipped a return spring 16 bearing against the end wall 17 of the housing 13 and against a shoulder 18 formed by the finger 15. The locking finger 10 is shaped to exhibit a passage ramp 19 inclined towards the axis 1 from the rear 20 towards the front 21 of the tool, for the passage of the battery 3 as it slides into its housing 4.

In the rest position, which is the locked position, the locking finger 10 is returned by the spring 16 projecting into the battery housing 4. The rod 9 is moved into a position of retraction of the finger 10 against the action of the spring 16. In the battery accommodating leg 5, on the anterior side which is the opposite end to the operating handle 6, and therefore to the rod and to the locking finger, and near the casing 2, there is fixed, via one end 23, an elastic leaf 22, bearing a boss 24 at its free end forming a retaining finger facing towards the battery accommodating housing 4. The leaf 22 runs roughly orthogonally to the axis 1, but its free portion is, however, inclined backwards so as to be able to pivot about its fixed end 23 and so that the retaining finger 24 can move roughly parallel to the axis 1, between a rest position, which is a locked position, in which it projects into the battery housing 4, and a retracted position, in its tool housing 38, against the elasticity of the leaf.

As far as the battery 3 is concerned, this battery being of roughly parallelepipedal overall shape, near its entry end face 25, it has, on its two opposed lateral sides 26, 27, two passage ramps 28, 29 for respectively negotiating the mechanical retaining finger 24 and the mechanical and electrical locking finger 10. A slight recess or hollow 30 is formed slightly beyond the ramp 28, exhibiting a ramp 31 inclined in the opposite direction to the ramp 28 to form, on the one hand, a boss 32 for the mechanical retention of the battery and, on the other hand, a housing 30 for accommodating the retaining finger 24 in the rest position. Here, the housing 30 is delimited not only by the ramp 31 but by another ramp 33 inclined in the opposite direction and situated at a distance away from the entry face 25 that is at least equal to the length of the leaf 22 considered in the direction in which the battery is introduced. Closer to its rear end face 34, on the side 27 of the battery, there is a locking catch 35 comprising an undercut internal shoulder 36, facing away from the entry face 25, and in this instance a ramp 37 inclined like the passage ramp 19 of the locking finger 10.

The fitting and removal of the battery 3 in the tool will now be explained.

Offering the battery 3 up via its entry face 25, it is introduced into the housing 4. It is pushed thereinto in the direction of the arrow 39, roughly orthogonal to the axis 1. The ramp 29, collaborating with the ramp 19 of the locking finger 10, retracts it into its housing 13, against the action of the spring 16. The battery continues to be pushed, the locking finger 10 sliding along the side 27 of the battery until the ramp 28, collaborating with the retaining finger 24, retracts it in its turn into its tool housing 38 against the elasticity of the leaf 22, then until the retaining finger 24, having passed the boss 32, and through elastic relaxation of the leaf 22, returns to the battery housing 30.

In this position, the battery is not yet electrically connected, but is mechanically retained in the tool in that, in order to extract it, it would be necessary to pull on it to overcome the friction force needed for the boss 32 to move past the retaining finger 24.

It will be noted that, because of the height or extent of the battery housing 30, the battery can still move to some extent, without the electrical connection ever being made inadvertently.

By continuing to push the battery 3 into its housing 4, it can be truly clipped in, that is to say mechanically and electrically locked, when the retaining catch 35 comes opposite the retaining finger 10 which, under the action of the spring 16, is returned by sliding into the catch.

Conversely, to remove the battery 3 from its housing 4, the trigger 11 is actuated against the action of the spring 16 to disengage the finger 10 from the catch 35 then the battery is pulled to electrically disconnect the electrical components of the tool. It still, however, remains mechanically secured to the tool, as long as the boss 32 has not been moved past the retaining finger 24. It is only by forcing this boss past the finger 24 and overcoming the corresponding friction forces that the battery can be fully removed from the tool.

The invention claimed is:

1. An electric hand tool comprising a casing, the casing further comprising:

electrically operated components;

a housing configured to accommodate a battery that powers the electrically operated components;

a locking means attached to the casing for locking the battery in the housing in a state of being electrically connected to the electrically operated components;

an actuating trigger configured to actuate the locking means; and a retaining finger extending from a surface of the housing, the retaining finger configured to retain the accommodated battery in the housing in an electrically disconnected state.

2. The tool according to claim 1, wherein the housing is configured to accommodate therein a battery by sliding, and wherein the locking means comprises a locking finger movable in a direction substantially orthogonal to the sliding direction of the battery.

3. A tool according to claim 2, in which the locking and retaining fingers are mounted so that they can be moved into retracted positions against the action of elastic return means.

4. A tool according to claim 2, further comprising a rod slidably connecting the actuating trigger to the locking finger.

5. A tool according to claim 2, in which the retaining finger is secured to a pivoting elastic leaf.

6. A tool according to claim 2, in which the locking finger and the retaining finger are configured to move in opposite directions when accommodating an inserted battery.

7. An electric hand tool comprising a casing that further comprises:

electrically operated components;

a housing configured to accommodate a battery that powers the electrically operated components;

a first battery securing element mounted to the casing, the first battery securing element configured to lock the battery in the housing in a position of being electrically connected to the components;

a second battery securing element mounted to the casing and configured to mechanically retain the battery in the housing in an electrically disconnected state, characterized in that the second battery securing element is designed to retain the battery in the electrically disconnected position only by friction; and an actuating trigger mounted to the casing and configured to actuate the first battery securing element;

wherein the second battery securing element includes a compressible retaining finger extending from an interior surface of the housing, the retaining finger configured to engage a recess disposed in an accommodated battery when the accommodated battery is locked in the housing by the first battery securing element.

8. A tool according to claim 7, wherein the housing is configured to accommodate therein a battery by sliding;

wherein the first battery securing element comprises a locking finger, and wherein locking finger and the retaining finger are configured to move in directions roughly orthogonal to the direction in which the battery slides.

9. A tool according to claim 8, wherein the locking finger and the retaining finger are configured to move into retracted positions against the action of an elastic return element.

10. A tool according to claim 8, wherein the locking finger is actuated by the actuating trigger via a slidably disposed rod.

11. Tool according to claim 8, wherein the retaining finger is secured to a pivoting elastic leaf.

12. A tool according to claim 8, in which the locking finger and the retaining finger are configured to move in opposite directions.

13. The tool according to claim 1, wherein the electrically operated components include an electric motor.

14. The tool according to claim 7, wherein the electrically operated components includes an electric motor.

* * * * *

UNITED STATES PATENT AND TRADEMARK OFFICE

CERTIFICATE OF CORRECTION

PATENT NO. : 7,638,233 B2
APPLICATION NO. : 10/803159
DATED : December 29, 2009
INVENTOR(S) : Vettoretti et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1686 days.

Signed and Sealed this

Ninth Day of November, 2010

David J. Kappos
*Director of the United States Patent and Trademark Office*